Patented Oct. 8, 1940

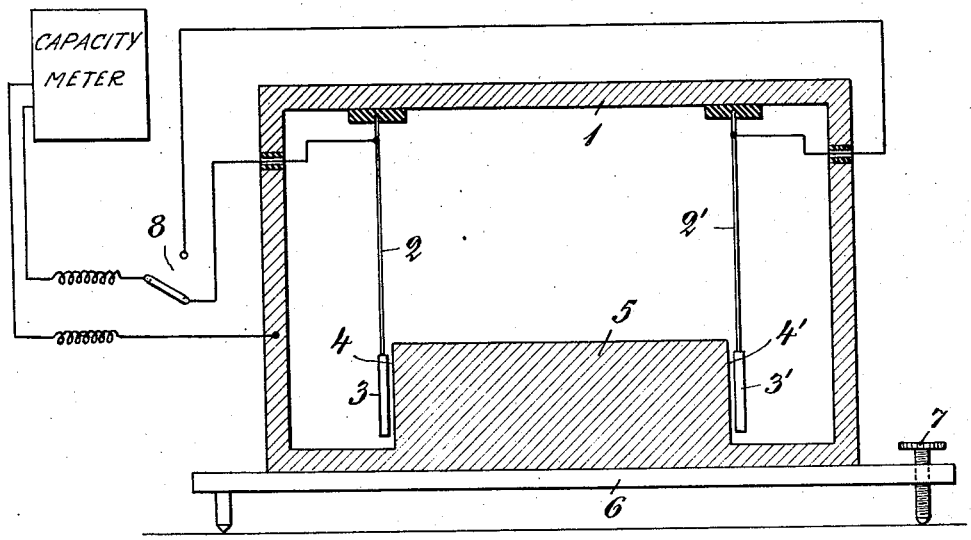

2,217,123

UNITED STATES PATENT OFFICE 2,217,123

APPARATUS FOR DETERMINING THE ALTERATIONS OF THE HORIZONTAL COMPONENTS OF THE FORCE OF GRAVITY

Johan David Malmqvist, Boliden, Sweden, assignor to Bolidens Gruvaktiebolag, Stockholm, Sweden, a joint-stock company, limited, of Sweden Application October 11, 1938, Serial No. 234,506
In Sweden November 26, 1937

3 Claims. (Cl. 265—1.4)

It has been known for a long time past that a freely suspended plummet is not always directed towards the center of the earth but that slight deviations from the normal plumb line occur. These deviations, which are termed deflections of the plumb line, are usually caused by superficial irregularities in the crust of the earth, for instance in the nature of the ground, and heterogeneous distribution of rocks or minerals having unequal specific gravity.

For geodetic purposes, deflections of the plumb line have previously been determined by means of very accurate theodolites, the angular separation between a fixed star and the plumb line in the point of observation then having been determined at a fixed moment of time. Furthermore, it is known to determine the deflection of the plumb line by measuring the electric or magnetic potential difference between a plummet and a body surrounding the plummet. However, said methods have been without practical importance since, upon measuring, the instruments have to be exactly set according to a line or surface, determined astronomically or geodetically.

The present invention relates to a method of determining the alterations of the horizontal components of the force of gravity by measuring the angle between plummets suspended freely from two points spaced one from the other a predetermined distance, said plummets consisting of plumb suspension wires having plumb weights secured thereto. A characteristic feature of the invention consists therein that the angle between the suspension wires of the two plummets suspended in one and the same instrument, but spaced one from the other, is determined with great accuracy. In order to obtain a measure of this angle the capacities of two variable condensers are measured, whose capacities are determined by the width of the air gaps between two metal surfaces plane ground on the appertaining plumb weights and two metal surfaces provided in the apparatus frame. For measuring these capacities there is preferably employed an ultramicrometer. From the values of the measured capacities a measure of the distances between the plumb weights and the appertaining metal surfaces is obtained. From said distances the angle between the two plumb lines, which are spaced one from the other a predetermined distance, may then be calculated if the distance between the suspension point and the center of gravity of the plumb weights is known. In such a way it is possible to ascertain exactly an angular deflection between two plumb suspension wires of 1/100 to 1/1000 second of arc.

An embodiment of the invention will be apparent from the accompanying drawing. From a metallic frame 1, all parts of which are made of the same material, two plumb suspension wires 2 and 2' are suspended by means of suitable fastening members secured under isolation to the frame. The plumb weights consist of two plane metal plates 3 and 3' which hang upon electrically conductive suspension wires or flat springs from which electric wires pass out from the apparatus. After leveling of the instrument the plumb weights are hanging at a very short distance from the limiting surfaces 4 and 4' of the metal body appertaining to the lower part of the metal frame and ground into the latter. Said metal body communicates electrically with the frame to which an electric wire is connected. The entire metal frame is secured to a bottom plate 6 which stands on the support by means of legs and vertically adjustable screws 7, so arranged that the instrument may be set in a suitable position by adjusting said screws. By the conducting wire leading to the frame, and across the change-over switch 8 the different condensers 3—4 or 3'—4' may be connected to an ultramicrometer in order to be measured.

A measuring of the deflection of the plumb line according to the invention conveniently takes place in the following manner. After the instrument has been placed on a rigid base, one of the condensers, e. g. 3—4, is connected to the ultramicrometer. By means of the levelling screws the apparatus is so adjusted that the condenser 3—4 obtains a certain capacity, i. e. that the plummet body 3 hangs at a desired distance from the metal surface 4. Thereafter the condenser 3'—4' is connected into circuit by throwing the change-over switch 8, and its capacity is determined. If the capacity obtained for said condenser is equal to that of the condenser 3—4, this signifies that the plummets hang parallel, i. e. the angle between them is nought. If a greater capacity is obtained for the condenser 3'—4' than for 3—4, this involves that the plummet 3' points inwards towards the apparatus; on the other hand, if a smaller capacity is obtained, the plummet 3' points in an outward direction from the apparatus. From the difference between the capacities of the condensers 3—4 and 3'—4' the angle between the plumb suspension wires may be calculated. By setting the instrument in different directions the deflections of the plumb line for different azimuths may be determined. Determinations of relative deflections of the plumb line are valuable, because from these there is obtained a measure of the alteration of the horizontal components of the force of gravity, and thus they form a useful complement to measurements of the alterations of the vertical component of the force of gravity.

On account of the fact that both plummets are suspended from the same metallic frame and spaced one from the other a predetermined distance, and the two metal surfaces, to which the position of the plummet bodies is referred, are ground into the same frame, the measurements will be influenced by the temperature to a rather small extent. However, the influence of temperature may be further reduced if the metallic frame is contained in a temperature regulated vessel.

The method may for instance be used for the purpose of prospecting ores, useful minerals and other subterrestrial localities, by accurate measuring of relative deflections of the plumb line.

Having thus described my invention, I declare that what I claim is:

1. An apparatus for determining the extent of ores and the like by determining changes in the horizontal components of the force of gravitation which comprises in combination two plummets, common means for suspending said plummets a predetermined distance one from the other, means forming variable condensers with each plummet whereby horizontal deflections of the plummets can be measured, said condenser means each comprising a stationary plate and a movable plate which is the plummet itself, whereby the movement of each plummet due to deflections effected by horizontal gravitational force will vary the capacity of each condenser, and means for measuring the capacity of the condensers to effect a measurement of the angle between the plummets.

2. An apparatus for determining the extent of ores and the like by determining changes in the horizontal components of the force of gravitation which comprises in combination two plummets, common means for suspending each plummet a predetermined distance one from the other in one and the same apparatus, means forming a variable condenser with each plummet and means for measuring the capacity of each condenser to effect a determination of the angle between the plummets.

3. An apparatus for determining the extent of ores and the like by determining changes in the horizontal components of the force of gravitation which comprises in combination two plummets, common means for suspending each plummet a predetermined distance one from the other in one and the same apparatus, means forming a variable condenser with each plummet and means for measuring the capacity of each condenser to effect a determination of the angle between the plummets, and means for completely enclosing the apparatus whereby it will not be influenced by changes in temperature.

JOHAN DAVID MALMQVIST.